US012522112B2

(12) United States Patent
Richert

(10) Patent No.: US 12,522,112 B2
(45) Date of Patent: Jan. 13, 2026

(54) PROTECTION DEVICE FOR A MOTOR CAR, IN PARTICULAR FOR A PASSENGER CAR, AND A METHOD FOR OPERATING SUCH A PROTECTION DEVICE

(71) Applicant: Mercedes-Benz Group AG, Stuttgart (DE)

(72) Inventor: Julien Richert, Sindelfingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/841,991

(22) PCT Filed: Feb. 10, 2023

(86) PCT No.: PCT/EP2023/053353
§ 371 (c)(1),
(2) Date: Aug. 27, 2024

(87) PCT Pub. No.: WO2023/161043
PCT Pub. Date: Aug. 31, 2023

(65) Prior Publication Data
US 2025/0170924 A1   May 29, 2025

(30) Foreign Application Priority Data

Feb. 28, 2022   (DE) ..................... 10 2022 000 713.4

(51) Int. Cl.
*B60N 2/02*     (2006.01)
*B60N 2/427*    (2006.01)
(Continued)

(52) U.S. Cl.
CPC ....... *B60N 2/0276* (2013.01); *B60N 2/42745* (2013.01); *B60R 22/343* (2013.01); *B60R 22/46* (2013.01)

(58) Field of Classification Search
CPC ................ B60N 2/0027; B60N 2/0276; B60N 2/42745; B60R 22/343; B60R 22/46
See application file for complete search history.

(56) References Cited

U.S. PATENT DOCUMENTS

| 5,810,417 A * | 9/1998 | Jesadanont | ............. B60R 22/26 296/68.1 |
| 6,076,887 A * | 6/2000 | Andersson | ......... B60N 2/42736 297/216.19 |

(Continued)

FOREIGN PATENT DOCUMENTS

| DE | 102007032524 A1 * | 1/2009 | ............. B60N 2/045 |
| DE | 10 2011 122 417 A1 | 9/2012 | |

(Continued)

OTHER PUBLICATIONS

International Search Report (PCT/ISA/210) issued in PCT Application No. PCT/EP2023/053353 dated Jun. 1, 2023 (2 pages).

(Continued)

*Primary Examiner* — Laura Freedman
(74) *Attorney, Agent, or Firm* — Crowell & Moring LLP

(57) ABSTRACT

A protection device of a motor car includes a seat system which has a seat and a backrest. A seat belt is assigned to the seat. The seat belt has a belt webbing where a person sitting on the seat is restrainable by the belt webbing. A blocking device is switchable between a released state in which the blocking device allows movement of the belt webbing away from the backrest and a locked state in which the blocking device prevents movement of the belt webbing away from the backrest. The protection device is configured to switch the blocking device from the released state into the blocked state and to move the backrest backwards in a motor car longitudinal direction when an accident involving the motor car has been determined and when an actual position, (Continued)

deviating from a target position, of the person sitting on the seat has been determined.

4 Claims, 1 Drawing Sheet

(51) Int. Cl.
  *B60R 22/343* (2006.01)
  *B60R 22/46* (2006.01)

(56) References Cited

U.S. PATENT DOCUMENTS

| | | | | |
|---|---|---|---|---|
| 6,463,372 | B1* | 10/2002 | Yokota | B60N 2/4279 |
| | | | | 280/801.1 |
| 6,629,575 | B2* | 10/2003 | Nikolov | B60N 2/4279 |
| | | | | 297/216.16 |
| 6,705,645 | B2* | 3/2004 | Motozawa | B60N 2/42736 |
| | | | | 297/480 |
| 7,604,081 | B2* | 10/2009 | Ootani | B60R 22/4604 |
| | | | | 297/216.13 |
| 8,364,351 | B2* | 1/2013 | Hashimoto | B60N 2/0276 |
| | | | | 701/45 |
| 8,641,140 | B2* | 2/2014 | Swierczewski | B60N 2/4279 |
| | | | | 297/216.19 |
| 9,604,594 | B2* | 3/2017 | Harda | B60R 21/01 |
| 10,759,380 | B2* | 9/2020 | Heinrich | B60R 22/46 |
| 10,814,816 | B2* | 10/2020 | Nagasawa | B60R 21/01552 |
| 10,974,627 | B2* | 4/2021 | Rosenberg | B60N 2/22 |
| 11,084,457 | B2* | 8/2021 | Ryl | B60R 22/46 |
| 11,745,685 | B2* | 9/2023 | Bharathi | B60N 2/02246 |
| | | | | 280/730.2 |
| 11,827,129 | B2* | 11/2023 | Behrens | B60N 2/0027 |
| 2020/0031310 | A1* | 1/2020 | Kreutz | B60R 22/48 |
| 2023/0264642 | A1* | 8/2023 | Jonsson | B60R 21/01552 |
| | | | | 701/45 |
| 2023/0365098 | A1* | 11/2023 | Tanabe | B60N 2/42754 |

FOREIGN PATENT DOCUMENTS

| | | | | |
|---|---|---|---|---|
| DE | 10 2011 108 915 A1 | | 1/2013 | |
| DE | 102011108918 A1 | * | 1/2013 | B60N 2/0276 |
| DE | 10 2011 122 203 B4 | | 6/2013 | |
| DE | 10 2011 122 418 A1 | | 6/2013 | |
| DE | 10 2016 010 431 A1 | | 3/2018 | |
| DE | 102017203421 A1 | * | 9/2018 | B60N 2/4221 |
| DE | 10 2017 207 379 A1 | | 11/2018 | |
| DE | 10 2018 002 967 A1 | | 10/2019 | |
| DE | 10 2019 120 891 A1 | | 2/2021 | |
| DE | 10 2022 000 547 A1 | | 4/2022 | |
| EP | 3 385 130 A1 | | 10/2018 | |
| JP | 2004500273 A | * | 1/2004 | |
| KR | 19990059439 A | * | 7/1999 | |
| WO | WO 2021/136686 A1 | | 7/2021 | |

OTHER PUBLICATIONS

German-language German Search Report issued in German Application No. 10 2022 000 713.4 dated Feb. 3, 2023, with partial English translation (7 pages).

* cited by examiner

PROTECTION DEVICE FOR A MOTOR CAR, IN PARTICULAR FOR A PASSENGER CAR, AND A METHOD FOR OPERATING SUCH A PROTECTION DEVICE

BACKGROUND AND SUMMARY OF THE INVENTION

The invention relates to a protection device for a motor car, in particular for a passenger car. The invention further relates to a method for operating such a protection device.

Such a protection device for a motor car, in particular for a passenger car, is already taken as known from DE 10 2017 207 379 A1. The protection device has a seat system which is arranged in the interior of the motor car and comprises a seat for a person and a backrest. The person can lean and thus support their back against the backrest. The protection device further comprises a seat belt held on the seat system and thus integrated into the seat system, which is assigned to the seat and has a belt webbing. By means of the belt webbing, the person sitting on the seat can be restrained, in particular in the event of an accident such as, for example, in the event of a frontal collision of the motor car. A blocking device is also provided which can be switched between a released state and a locked state. In the released state, the blocking device allows the belt webbing to be moved away from the backrest and in the process to be moved, for example, forwards in the vehicle longitudinal direction. In the locked state, the blocking device prohibits or prevents the belt webbing from being moved away from the backrest and in the process from being moved, for example, forwards in the vehicle longitudinal direction.

Furthermore, a method for controlling a reversible seat belt tensioner of a seat belt system assigned to a vehicle seat is taken as known from DE 10 2018 002 967 A1. Furthermore, a seat belt tensioner for tightening a seat belt is known from DE 10 2016 010 431 A1.

The object of the present invention is to create a protection device for a motor car and a method for operating such a protection device, so that a particular degree of safety can be realized.

In order to further develop a protection device of the type specified herein in such a way that a particularly high level of safety can be realized, it is provided according to the invention that the protection device is designed to switch the blocking device from the released state into the blocked state when an accident involving the motor car has been determined and when an actual position, deviating from a target position, of the person sitting on the seat has been determined and is designed to move, in particular to pivot, the backrest, also referred to as a back or seat back, backwards in the vehicle longitudinal direction while the blocking device is in the blocked state. In other words, the protection device is designed, for example, to determine an accident involving the motor car, such as for example a frontal collision of the motor car, also referred to as a frontal crash. Furthermore, the protection device is designed, for example, to determine an actual position, deviating from the target position, of the person sitting on the seat. If the protection device determines the accident and if the protection device determines the actual position, the blocking device is switched from the released state, in particular actively and/or electrically, into the blocked state, and the backrest is moved backwards in the vehicle longitudinal direction, in particular pivoted, in particular relative to a seat part of the seat system formed for example as a single seat, in particular after the blocking device has been switched from the released state into the blocked state and while the blocking device is in the blocked state. The feature that the blocking device is switched and the backrest is moved when the accident is determined is understood to mean that, for example, the accident is determined, in particular detected, as being an actually occurring event, i.e., for example, an actual beginning of the accident is determined, in particular by means of a sensor and/or it is determined, for example, at a point in time that a probability with which an accident of the motor car occurs, i.e., begins, at a future point in time in relation to the point in time exceeds a limit, in particular a predefined or predefinable limit. Thus, for example, it is possible to start switching the blocking device from the released state into the blocked state and moving the backrest backwards in the vehicle longitudinal direction before the actual beginning of the accident, and in particular it is conceivable that switching the blocking device from the released state into the blocked state and moving the backrest backwards in the vehicle longitudinal direction has already been completed by the time the accident begins. A particularly high level of safety can be achieved as a result. The target position is, for example, a predefined or predefinable target position, which, is stored, for example, in a memory of an electronic computing device, by means of which, for example, the protection device is operated.

Furthermore, it is conceivable that the protection device has a seat belt tensioner, by means of which the belt webbing can be tightened, wherein the belt webbing and, via the belt webbing, the upper body of the person sitting on the seat can be moved in the direction of the backrest, in particular against the backrest. In this respect, it is particularly conceivable that particularly if a force that can be exerted on the person, in particular on the upper body of the person, by means of the belt tensioner via the belt webbing is sufficiently high to move the upper body in the direction of or against the backrest, the blocking device and thus a locking of the belt webbing that can be moved by means of the blocking device can be dispensed with. In this case, a mass inertia for example could work directly against motor power of the seat belt tensioner. In particular, the seat belt tensioner can be designed as a reversible seat belt tensioner, in particular as a reversible tensioning retractor. For example, the seat belt has a reel on which the belt webbing can be rolled up and from which the belt webbing can be unrolled. Furthermore, the belt webbing can have an in particular electric motor, by means of which the reel can be rotated and the belt webbing can be tensioned as a result.

The movement, in particular pivoting, of the backrest backwards takes place, for example, by means of a motor, in particular an electric motor, by means of which for example the backrest, in particular an upper edge of the backrest in the vehicle direction, can be moved, in particular pivoted, backwards in the vehicle longitudinal direction. In particular, the backrest can be adjusted, for example by means of the motor, backwards in the vehicle longitudinal direction, i.e., moved, in particular pivoted, so that the backrest is moved, in particular pivoted, relative to the aforementioned seat part. In this case, the person can, for example, sit with their buttocks on the seat part and lean their back against the backrest. The invention is based in particular on the following findings and considerations:

If a person, also referred to as an occupant, sitting in the seat leans forwards to reach into a glove compartment, for example, the occupant is out of position, i.e., in the actual position that deviates from the target position. Compared to the target position, the actual position is less favourable for catching and restraining the occupant in the actual position in the event of an accident, such as a frontal collision of the motor car, by means of a restraint system of the motor car. The invention now enables at least a part of the person in the actual position, in particular the upper body of the person, to be displaced, in particular rotated, and thus moved from the actual position in the direction of or into the target position, in particular when an imminent accident, such as an imminent collision, is detected or determined. For this purpose, the seat belt is integrated into the seat system, in particular into the backrest, i.e., it is held on the seat system, in particular on the backrest. The seat system is thus also referred to as a belt integral seat. Particularly when the seat system enables so-called comfort or relaxed sitting positions, the blocking device can in particular be used as an electric locking means in order to lock the belt webbing, in particular electrically. This is particularly advantageous compared to a mechanical locking means, as the belt webbing can then be blocked in or at different angles, i.e., in or at different inclinations of the backrest, i.e., it can be prevented from being moved (further) away from the backrest.

The actual position can, for example, be detected, in particular visually, by at least one interior camera, i.e., by at least one camera arranged in the interior. If it is thus determined that the person is in the target position and a critical situation such as an imminent accident is determined, the blocking device, which is designed in particular as an electrical lock, is activated, especially electrically, so that the belt webbing and thus the person's upper body cannot be moved any further away from the backrest, especially forwards in the longitudinal direction of the vehicle. Expressed again in other words, because the belt webbing cannot be moved (any further) away from the backrest when the blocking device is locked, the belt webbing prevents the person from being able to move their upper body any further away from the backrest. Furthermore, the seat system is adjusted in such a way that the backrest and thus the blocked belt webbing and, via this, the upper body are moved backwards in the vehicle longitudinal direction, in particular relative to a structure of the motor car that is designed, for example, as a self-supporting chassis and delimits the interior. This increases, for example, a distance between the person's head and an air bag, at least in the vehicle longitudinal direction, so that when the accident actually occurs or begins, the person can be caught and restrained particularly favourably by the air bag.

The invention also includes a method for operating such a protection device. Advantages and advantageous embodiments of the protection device according to the invention are considered as advantages and advantageous embodiments of the method according to the invention and vice versa. In particular, the method is carried out by means of the electronic computing device.

Further advantages, features and details of the invention can be seen from the following description of a preferred exemplary embodiment and with reference to the drawings. The features and combinations of features mentioned above in the description as well as the features and combinations of features mentioned below in the description of the figures and/or shown alone in the figures can be used not only in the combination indicated in each case, but also in other combinations or on their own, without leaving the scope of the invention.

DETAILED DESCRIPTION OF THE DRAWINGS

Figure 1:
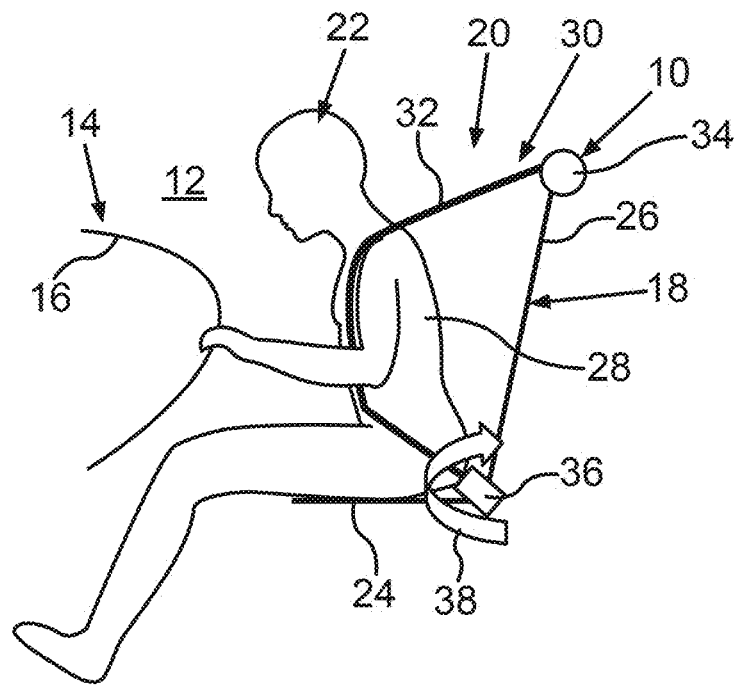
FIG. 1 is a schematic side view of a protection device for a motor car, in particular for a passenger car.

In the figures, identical or functionally identical elements are provided with the same reference numerals.

FIG. 1 shows, in a schematic side view, a protection device 10 for a motor car, in particular formed as a passenger car, the interior of which is labelled in FIG. 1 with 12 and in particular is delimited by a structure of the motor car in the form, for example, of a self-supporting chassis. A cockpit 14 which comprises an instrument panel 16 is also arranged in the interior 12. The protection device 10 has a seat system 18 arranged in the interior 12 of the motor car, which is designed as a single seat in the exemplary embodiment shown in the figures. For example, the seat system 18 is the front passenger seat. The seat system 18 has in particular exactly one seat 20, on which a person 22, also referred to as an occupant, can sit and in this case is sitting. The seat system 18 has a seat part 24 on which the person 22 can support their buttocks and therefore sit. Furthermore, the seat system 18 has a backrest 26, also simply referred to as a back or seat back, which can be pivoted and thus moved relative to the seat part 24 around a pivot axis running in particular in a vehicle transverse direction. The person 22 can lean and thus support their upper body 28, in particular their back, against the backrest 26.

The protection device 10 also has a seat belt 30 which is assigned to the seat 20 and which is held on the seat system 18. The seat belt 30 has a flexible, i.e., pliable, belt webbing 32, by means of which the person 22 can be restrained in the event of an accident, such as in the event of a frontal collision of the motor car. The seat belt 30 comprises a reel 34 which is held on the seat system 18, in particular in a backrest 26. At least one length of the belt webbing 32 can be wound up on the reel 34 and can be unwound from the reel 34. The seat belt 30 further has a seat belt tongue (not recognizable in the figures) which is coupled to the belt webbing 32. Furthermore, the seat belt 30 comprises a buckle 36 for example, which in the present case is held on the seat system 18. The seat belt tongue can be inserted into the buckle 36, whereby the seat belt tongue and the belt webbing 32, via the seat belt tongue, can be fastened to the buckle 36. As a result, the person 22 can strap themselves in.

In FIG. 1, the person 22 leans forwards in order to reach into a glove compartment, for example. It can be recognized that the back 28 and thus the upper body of the person 22 is spaced further away from the backrest 26 in the vehicle longitudinal direction. For example, in order to be able to move the upper body forwards in the vehicle longitudinal direction and thus away from the backrest 26 while the person 22 is strapped in, i.e., while the seat belt tongue is inserted into the buckle 36, a blocking device of the protection device 10, which is not recognizable in the figures, is in a released state in which the blocking device allows the belt webbing 32 to be unwound from the reel 34 and thereby moved forwards in the vehicle longitudinal direction away from the backrest 26. In FIG. 1, as a result of bending or leaning their upper body forwards, the person 22 is in an actual position which deviates from a target position in which, for example, the back 28 rests directly against the backrest 26.

The blocking device can be switched between the released state and a locked state which is also referred to as a blocked state. In the locked state, the blocking device stops, i.e., prevents, the belt webbing 32 from being unwound from the reel 34 and thus moved forwards away from the backrest 26 in the vehicle longitudinal direction. In particular, the blocking device prevents a rotation of the reel 34 in the blocked state, so that the belt webbing 32 cannot be unwound further by the reel 34 and thus cannot be moved further by the backrest 26 and in the process, for example, forwards in the vehicle longitudinal direction.

Figure 2:
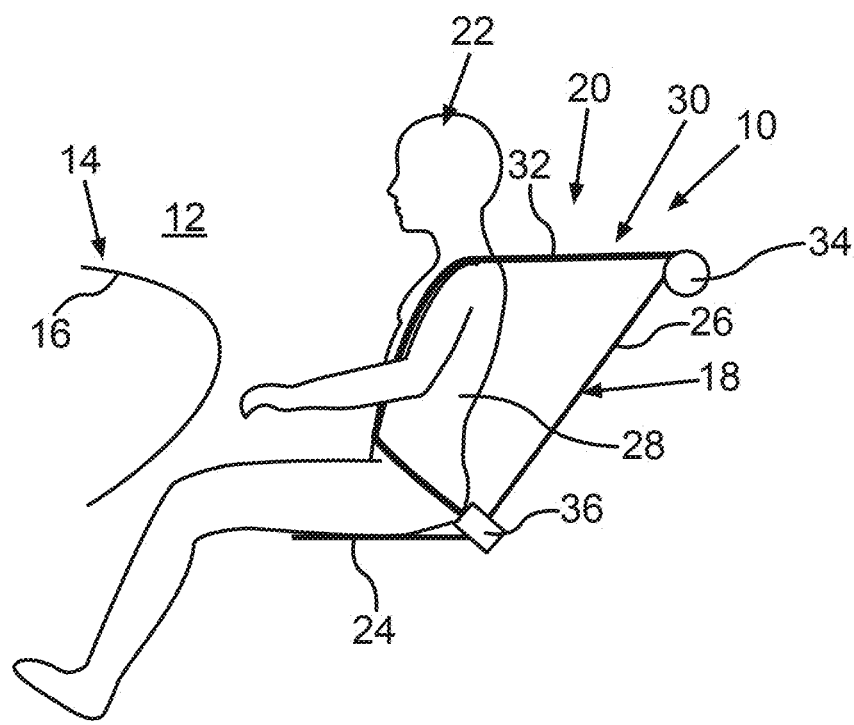
FIG. 2 is a further schematic side view of the protection device.

In order to be able to realize a particularly high level of safety, the protection device 10 is designed to switch the blocking device, in particular electrically, from the release state into the blocked state when an accident of the motor car has been determined and when the actual position has been determined and, in particular while the blocking device is in the blocked state, to pivot the backrest 26 backwards relative to the seat part 24 in the vehicle longitudinal direction and thus to move it backwards in the vehicle longitudinal direction. In other words, if an impending accident, for example, is determined and assessed as being unavoidable, for example, and if it is determined, for example by means of an interior camera, in particular if it is detected that the person 22 is in the actual position which deviates from the target position, the blocking device is switched from the released state into the blocked state, in particular electrically, and, as illustrated in FIG. 1 by an arrow 38, the backrest 26 is pivoted backwards relative to the seat part 24 in the vehicle longitudinal direction. As can be seen from a combined view of FIGS. 1 and 2, this straightens up the upper body of the person 22 from the actual position and thus moves it backwards in the vehicle longitudinal direction. Therefore, the person 22 comes into the target position or into an intermediary position which, although it still differs from the target position, differs less from the target position than the actual position shown in FIG. 1. Consequently, the person 22 is located in a position that is advantageous in order to be able to catch and restrain the person 22 in the event of the accident by means of a restraint system, such as, for example, by means of an air bag. Therefore, a particularly high safety level can be realized.

The reel 34 is also referred to as a belt retractor. If the blocking device is in the blocked state, the belt retractor is locked, i.e., locked against rotation taking place in particular relative to the seat system 18, so that the belt webbing 32 cannot be unwound further by the belt retractor and thus cannot be moved further forwards away from the backrest 26 in the vehicle longitudinal direction. As a result, when the backrest 26 is pivoted backwards in the vehicle longitudinal direction, the upper body moves with the backrest 26 via the belt webbing 32, and specifically backwards in the vehicle longitudinal direction, whereby the upper body is straightened up, based on the actual position. Consequently, the person 22 can be advantageously caught and restrained.

LIST OF REFERENCE CHARACTERS

10 protection device
12 interior
14 cockpit
16 instrument panel
18 seat system
20 seat
22 person
24 seat part
26 backrest
28 back
30 seat belt
32 belt webbing
34 reel
36 buckle
38 arrow

The invention claimed is:

1. A protection device (10) of a motor car, comprising:
a seat system (18) which is disposed in an interior (12) of the motor car has a seat (20) and a backrest (26);
a seat belt (30) that is held on the seat system (18) is assigned to the seat (20), wherein the seat belt (30) has a belt webbing (32) and wherein a person (22) sitting on the seat (20) is restrainable by the belt webbing (32); and
a blocking device which is switchable between a released state in which the blocking device allows a movement of the belt webbing (32) away from the backrest (26) and a blocked state in which the blocking device prevents the movement of the belt webbing (32) away from the backrest (26);
wherein the protection device (10) is configured to switch the blocking device from the released state into the blocked state and to pivot the backrest (26) backwards in a motor car longitudinal direction when an accident involving the motor car has been determined and when an actual position of an upper body of the person (22) sitting on the seat (20), deviating forward in the motor car longitudinal direction from a target position of the upper body of the person (22) sitting on the seat (20), has been determined;
wherein the protection device (10) is configured to pivot the backrest (26) backwards in the motor car longitudinal direction when the accident has been determined and when the actual position has been determined such that the upper body of the person (22) sitting on the seat (20) comes into the target position or into an intermediary position which differs from the target position less than the actual position differs from the target position.

2. The protection device (10) according to claim 1, wherein the blocking device is transferable electrically from the released state into the blocked state.

3. The protection device (10) according to claim 1, further comprising a belt tensioner via which the belt webbing (32) is tightenable and thereby the belt webbing (32) and, via the belt webbing (32), the upper body (28) of the person (22) sitting on the seat (20) is movable in a direction of the backrest (26).

4. A method for operating the protection device (10) according to claim 1, comprising the steps of:
switching the blocking device from the released state into the blocked state and pivoting the backrest (26) backwards in the motor car longitudinal direction when the accident has been determined and when the actual position has been determined such that by the pivoting the upper body of the person (22) sitting on the seat (20) comes into the target position or into the intermediary position which differs from the target position less than the actual position differs from the target position.

* * * * *